United States Patent [19]

Haag et al.

[11] Patent Number: 5,069,794

[45] Date of Patent: Dec. 3, 1991

[54] SEPARATION OF MIXTURE COMPONENTS OVER MEMBRANE COMPOSED OF A PURE MOLECULAR SIEVE

[75] Inventors: Werner O. Haag, Lawrenceville; John G. Tsikoyiannis, Princeton, both of N.J.

[73] Assignee: Mobil Oil Corp., Fairfax, Va.

[21] Appl. No.: 674,635

[22] Filed: Mar. 25, 1991

Related U.S. Application Data

[63] Continuation-in-part of Ser. No. 533,328, Jun. 5, 1990, Pat. No. 5,019,263.

[51] Int. Cl.[5] ............................................. B01D 61/00
[52] U.S. Cl. ...................... 210/650; 210/651; 210/653; 210/510.1; 55/16; 55/17
[58] Field of Search ........... 210/650, 651, 653, 500.25, 210/509, 510.1; 55/16, 75, 34, 17; 502/4, 5, 60, 65; 528/5; 127/46.3; 204/295

[56] References Cited

U.S. PATENT DOCUMENTS

| | | | |
|---|---|---|---|
| 3,266,973 | 8/1966 | Crowley | 162/164 |
| 3,392,103 | 7/1968 | Berger | 204/295 |
| 3,413,219 | 11/1968 | Kraus et al. | 210/23 |
| 3,499,537 | 3/1970 | Bittles | 210/510 |
| 3,628,669 | 12/1971 | McKinnis et al. | 210/510 |
| 3,791,969 | 2/1974 | Patil et al. | 210/23 |
| 4,012,206 | 3/1977 | Macriss et al. | 55/34 |
| 4,238,590 | 12/1980 | Scholze et al. | 528/5 |
| 4,699,892 | 10/1987 | Suzuki | 502/4 |
| 4,735,193 | 4/1988 | Kulprathipanja et al. | 127/46.3 |
| 4,740,219 | 4/1988 | Kulprathipanja et al. | 55/16 |
| 4,861,351 | 8/1989 | Nicholas et al. | 55/75 |
| 4,880,544 | 11/1989 | Barone | 210/639 |
| 4,950,312 | 8/1990 | Puppe et al. | 55/75 |
| 4,957,514 | 11/1990 | Golden et al. | 55/75 |
| 5,006,497 | 4/1991 | Herbst et al. | 502/65 |
| 5,019,263 | 5/1991 | Haag et al. | 210/500.25 |

OTHER PUBLICATIONS

Demertzis, M. and Evmiridis, N. P., Potentials of Ion-Exchanged Synthetic Zeolite Polymer Membranes, 1986, J. Chem. Soc. Faraday Trans. 82, 3647-3655.

Japan Kokai Tokkyo Koho, Gas Separating Membranes Japan Patent 60,129,119, 7/10/85, in Chem. Abs. 103:1623112.

Koresh, J. E., and Soffer, A., Mechanism of Permeation Through Molecular-Sieve Carbon Membrane, J. Chem. Soc., Faraday Trans.82, 2057-2063, 1986.

Primary Examiner—Robert A. Dawson
Assistant Examiner—Ana Fortuna
Attorney, Agent, or Firm—Alexander J. McKillop; Charles J. Speciale; Dennis P. Santini

[57] ABSTRACT

A process is provided for separation of components of a gaseous or liquid mixture which comprises contacting the mixture with a synthetic, non-composited microporous membrane comprising a continuous array of crystalline molecular sieve material.

18 Claims, 4 Drawing Sheets

FEED

PERMEATE

MEMBRANE

SEPARATION OF MIXTURE COMPONENTS OVER MEMBRANE COMPOSED OF A PURE MOLECULAR SIEVE

CROSS-REFERENCE TO RELATED APPLICATIONS

This is a continuation-in-part of application Ser. No. 533,328, filed June 5, 1990, now U.S. Pat. No. 5,019,263.

BACKGROUND OF THE INVENTION

The invention relates to membranes having molecular sieve properties and/or catalytic activity and a process for separation of mixture components by contact with the membranes.

Membrane separation technology is a rapidly expanding field. Organic and inorganic materials have been used as membranes in a variety of separation processes, such as microfiltration, ultrafiltration, dialysis, electrodialysis, reverse osmosis and gas permeation. Most membranes have been made from organic polymers with pore sizes ranging from 10 to 1000 angstroms. Membranes have also been made from inorganic materials such as ceramics, metals, clay and glasses.

Synthetic zeolites have been used as adsorptive separation agents for gases or liquids or as catalysts and have usually been used in the form of granules or pellets often incorporated with a binder such as clay or alumina. The potential of zeolites as components in microporous membranes has not been fully explored.

Zeolites have also been used as components in composite membranes. In such membranes, in addition to the presence of a zeolite phase, the membrane material always contains a second phase with distinctly different chemical composition, physical properties, chemical properties and morphology. As a result of the presence of different phases, the separation properties of composite membranes are determined by the individual properties of the different phases and of the phase boundaries. (Demertzes et al., *J. Chem. Soc.*, Faraday Trans. 1, 82, 3647 (1986)). Examples of such non-zeolitic phases are polymeric materials and inorganic materials such as glasses, silica or alumina.

Composite membranes or filters of materials such as paper and polymers which may contain dispersed particles of zeolites have been described, for example, in U.S. Pat. Nos. 3,266,973; 3,791,969; 4,012,206; 4,735,193; 4,740,219 and European Patent Application 254758.

U.S. Pat. No. 4,699,892 describes a composite membrane having an ultrathin film of a cage-shaped zeolite of from 10 to several hundred angstroms in thickness on a porous support of metal, inorganic material or polymeric material.

Non-composited inorganic membranes are described, for example, in U.S. Pat. Nos. 3,392,103; 3,499,537; 3,628,669 and 3,791,969.

U.S. Pat. No. 3,392,103 describes membranes made from hydrous metal oxide ceramics such as aluminum oxide. U.S. Pat. No. 3,499,537 discloses membranes of pressed and sintered aluminum vanadate powder. U.S. Pat. No. 3,628,669 discloses silica membranes made by leaching thin inorganic glass films. U.S. Pat. No. 3,791,969 describes membranes of flocculated sodium exfoliated vermiculite.

Other non-composited membranes described in U.S. Pat. Nos. 3,413,219 and 4,238,590 require some manner of supporting material. U.S. Pat. No. 3,413,219 discloses the preparation of membranes from colloidal hydrous oxide which is formed on a permeable substrate. U.S. Pat. No. 4,238,590 discloses silicic acid heteropolycondensates suitable for use as membranes but which are not self-supporting and are stretched over porous or net-like supporting material.

It is therefore an object of the invention to provide a pure and spatially continuous molecular sieve membrane for use in mixture component separation. It is also an object to provide a material of macroscopic dimensions, composed only of a zeolitic phase, and having adequate mechanical strength to maintain its macroscopic structural integrity and capable of carrying out molecular sieve action.

SUMMARY OF THE INVENTION

The present invention comprises a process for separation of mixture components by contacting the mixture with a synthetic, non-composited, microporous membrane comprising a continuous array of crystalline molecular sieve material. The molecular sieve may have a composition in terms of mole ratios of oxides as follows:

$$X_2O_3: (n)YO_2$$

wherein X is a trivalent element of at least one member selected from the group consisting of aluminum, boron, iron and gallium; Y is a tetravalent element of at least one member selected from the group consisting of silicon, germanium and titanium; and, n is at least about 2.

The crystalline material may also be an aluminophosphate, silicoaluminophosphate, metaloaluminophosphate or metaloaluminophosphosilicate.

In the method for preparing the microporous membrane, a chemical mixture capable of forming the crystalline molecular sieve material is prepared and the mixture is formed into a thin, uncomposited, cohesive, continuous membrane, dried and calcined.

The process of this invention comprises using the membrane for the separation of components of a gaseous or liquid mixture having at least two components. The mixture is contacted with an upstream face of the membrane under separation conditions such that at least one component of the mixture has a greater steady state permeability through the membrane than at least one of the remaining component(s) of the mixture. After contact of the mixture with the membrane and passage through the membrane, the component with the greater permeability is collected on the downstream side of the membrane.

The membrane is also useful as a catalyst. The membrane is rendered catalytically active and a feedstock is passed through the upstream face of the membrane under catalytic conditions. For cases where all or at least one of the reaction products have higher permeability than the reactant(s), they will emerge from the downstream side of the membrane. In equilibrium limited reactions, this will lead to higher single-pass conversion of the reactant(s) than normally observed and allowed by thermodynamic equilibrium constraints. At least one or all of the reaction products are collected on the downstream side of the membrane. Other advantages can be realized, for example, when one or all of the products inhibit or poison the desired reaction, or when they would undergo undesired secondary reactions.

The microporous zeolitic membranes for use herein advantageously have unique molecular sieve and/or catalytic properties due to the well defined pore structure of zeolites. The membranes have the advantages of having different properties from traditionally used granular form zeolites, and from composited membranes which include zeolites. These different properties result from the sheet-like structure of the membranes and the composition of pure zeolite in the membrane.

For a better understanding of the present invention, together with other and further objects, reference is made to the following description, taken together with the accompanying drawings, and its scope will be pointed out in the appended claims.

DETAILED DESCRIPTION OF THE INVENTION

Zeolite materials, both natural and synthetic, have been demonstrated in the past to have catalytic properties for various types of hydrocarbon conversion. Certain zeolitic materials are ordered, porous, crystalline aluminosilicates having a definite crystalline structure as determined by X-ray diffraction, within which there are a large number of smaller cavities and channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Zeolites typically have uniform pore diameters of about 3 angstroms to about 10 angstroms. The chemical composition of zeolites can vary widely and they typically consist of $SiO_2$ in which some of the silicon atoms may be replaced by tetravalent ions such as Ti or Ge, by trivalent ions such as Al, B, Ga, Fe, or by bivalent ions such as Be, or by a combination of any of the aforementioned ions. When there is substitution by bivalent or trivalent ions, cations such as Na, K, Ca, $NH_4$ or H are also present.

Representative examples of siliceous zeolites are small pore zeolites such as NaA, CaA, Erionite; medium pore zeolites such as ZSM-5, ZSM-11, ZSM-22, ZSM-23, ZSM-48, ZSM-12, zeolite beta; and large pore zeolites such as zeolite L, ZSM-4 (omega), NaX, NaY, CaY, REY, US-Y, ZSM-20, and mordenite.

Zeolites include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of the cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite beta (U.S. Pat. No. 3,308,069); zeolite ZK-5 (U.S. Pat. No. 3,247,195); zeolite ZK-4 (U.S. Pat. No. 3,314,752); zeolite ZSM-5 (U.S. Pat. No. 3,702,886); ZSM-5/ZSM-11 intermediate (U.S. Pat. No. 4,229,424); zeolite ZSM-23 (U.S. Pat. No. 4,076,842); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245), ZSM-38 (U.S. Pat. No. 4,046,859); and zeolite ZSM-48 (U.S. Pat. No. 4,375,573), merely to name a few. All of the above patents are incorporated herein by reference.

The silicon/aluminum atomic ratio of a given zeolite is often variable. For example, zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 12. U.S. Pat. No. 3,941,871 (Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724; 4,073,865 and 4,104,294 describe crystalline silicas of varying aluminum and metal content. These zeolites can consist essentially of silica, containing only trace amounts of aluminum.

Another class of molecular sieves consists of $AlO_2$ and $PO_2$ units ($AlPO_4$) whose Al or P constituents optionally may be substituted by other elements such as Si (called silicoaluminophosphates or SAPO's), or metals (called metaloaluminophosphates or MeAPO's) or combinations thereof (called metaloaluminophosphosilicates or MeAPSO's). As with aluminosilicates, the $AlPO_4$'s, SAPO's, MeAPO's and MeAPSO's are crystalline and have ordered pore structures which accept certain molecules while rejecting others and they are often considered to be zeolitic materials.

Aluminum phosphates are taught in U.S. Pat. Nos. 4,310,440 and 4,385,994 for example. These aluminum phosphate materials have essentially electroneutral lattices. U.S. Pat. No. 3,801,704 teaches an aluminum phosphate treated in a certain way to impart acidity.

The crystalline silicoaluminophosphates useful for the membranes of the invention have molecular sieve framework which may exhibit ion-exchange properties and may be converted to material having intrinsic catalytic activity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5) and 4,632,811 (MCM-3). All of the above patents are incorporated herein by reference.

A method for synthesizing crystalline metaloaluminophosphates (MeAPO's) is shown in U.S. Pat. No. 4,713,227, and an antimonophosphoaluminate and the method for its synthesis are taught in U.S. Pat. No. 4,619,818. U.S Pat. No. 4,567,029 teaches metalloaluminophosphates, and titaniumaluminophosphate and the method for its synthesis are taught in U.S. Pat. No. 4,500,651.

Compositions comprising crystals having a framework topology after heating at 110° C. or higher giving an X-ray diffraction pattern indicating pore windows formed by 18 tetrahedral members of about 12–13 Angstroms in diameter are taught in U.S. Pat. No. 4,880,611, incorporated herein by reference.

The membranes of the invention consist essentially of only molecular sieve material, as contrasted with prior art composite membranes which can contain various amounts of molecular sieve material composited with other materials. The zeolitic membrane may contain a single zeolite or mixtures of zeolites. The membrane can be monocrystalline or polycrystalline. "Monocrystalline" is intended to mean consisting of a single crystal. "Polycrystalline" is intended to mean consisting of a continuous intergrowth of more than a single crystal, e.g. many crystals.

The membrane can be produced, for example, by synthesis under hydrothermal conditions on a non-porous substrate forming surface, such as a polymer, a metal or glass. Suitable polymer surfaces are, for example, fluorocarbon polymers such as tetrafluoroethylene (TFE) and fluorinated ethylene-propylene polymers (FEP). Suitable metal surfaces are, for example, silver, nickel, aluminum and stainless steel. A thin layer of metal on glass or an organic polymer or other material may be used as the forming surface. A thin layer of a polymer film on glass or other material may also be used as the forming surface. The forming surface may have various configurations. For example, the surface may be flat, curved, a hollow cylinder or honeycomb-shaped.

Although amorphous materials can be used as substrates for crystal growth, monocrystalline surfaces can also be used. The synthesis can also be achieved by mechanical compression of a powder form zeolite, followed by chemical treatment.

In forming the membranes of the invention, a non-porous surface is contacted with a chemical mixture capable of forming the desired crystalline material under crystallization conditions. After a period of time under suitable conditions, a cohesive membrane of crystallized material forms on the non-porous substrate surface. The thickness dimension of the membrane may vary from about .1 micron to about 400 microns depending upon the length of time the surface is contacted with the chemical mixture and the amount of mixture provided. Other means such as varying the temperature or the ratio of crystallization mixture to forming surface area are also effective in adjusting the membrane thickness to a desired dimension.

The chemical composition of the forming mixture, in terms of moles per mole $YO_2$, includes:

| | Broad | Preferred | Most Preferred |
|---|---|---|---|
| $H_2O/YO_2$ | 5 to 500 | >20 to 500 | >40 to 500 |
| $X_2O_3/YO_2$ | 0 to 0.2 | 0 to 0.014 | 0 to 0.010 |
| $OH^-/YO_2$ | 0 to 2 | 0.02 to 0.15 | 0.02 to 0.15 |

In general, preferred forming mixture compositions are those combining a high $H_2O/YO_2$ ratio (towards the upper end of the indicated range), a low $X_2O_3/YO_2$ ratio and a low $OH^-/YO_2$ ratio. Also microporous crystals with a tendency to form twinned crystals are particularly prone to form membranes.

To form membrane film of uniform thickness and avoid homogeneous crystallization, a minimum $H_2O/YO_2$ ratio is preferred, which depends on the $X_2O_3/YO_2$ ratio. This minimum ratio is about 20 for $X_2O_3/YO_2 \leq 0.0025$, 70 for $X_2O_3/YO_2 = 0.01$ and 130 for $X_2O_3/YO_2 = 0.014$.

For crystallizing a membrane having the structure of ZSM-5, for example, it is preferred to use an organic matrix such as tetrapropylammonium (TPA) in a ratio $TPA/YO_2$ of k0-2, preferably 0.05-1. Other well-known organic matrices can be used for the syntheses of other zeolite membranes.

The method of synthesis can be either in a batch process, semicontinuous or continuous process. In a batch process, it is preferred to use static conditions, i.e. absence of stirring, to promote formation of a membrane. In a continuous or semicontinuous process, a forming solution or slurry is passed through the reaction zone with or without recycle. In the recycle mode, the composition of the solution can be adjusted and maintained at optimal concentrations. This mode of operation is particularly advantageous when very high $H_2O/YO_2$ ratios are employed.

The thickness of the membrane can be controlled by varying the crystallization time or by adjusting the total nutrient (e.g. $SiO_2$) provided per surface area of the membrane-forming surface.

The time of contacting of the surface with the reaction mixture may be from about 0.5 hrs. to about 1000 hrs., preferably from about 1 hr. to about 100 hrs.; at a temperature of from about 50° C. to about 250° C., preferably from about 110° C. to about 200° C.; and at a pressure from about 1 atm to about 100 atm, preferably from about 1 atm to about 15 atm.

After the desired period of time, the substrate, now coated with crystalline material, is removed from contact with the chemical mixture, washed with distilled water and allowed to dry.

The layer of crystalline material may be removed from the non-porous surface by various means depending upon the material chosen for the forming surface. The layer may be separated from polymeric surfaces, for example, by mechanical means such as careful scraping or peeling. Removal from metal surfaces may be accomplished with the use of solvents such as acetone, or by dissolving the metal with acid such as aqueous hydrochloric or nitric acid. With a support consisting of metal or metallized material such as aluminum on glass or TEFLON®, treatment with an aqueous mineral acid can be employed.

The membrane material may also be calcined before or after removal from the substrate for example in an inert atmosphere or in air at from about 200° to about 700° C. for about 1 hr. to about 50 hrs.

The membrane may also be treated to adjust its catalytic properties before or after removal from the surface, for example by steaming and/or ion exchange. Low or zero catalytic activity can be obtained by incorporating alkali or alkaline earth cations into the membrane.

Catalytic activity can be increased by methods known in the art such as by increasing the aluminum content or by introducing a hydrogenation-dehydrogenation function into the membrane.

The original ions, i.e. cations or anions, of the synthesized membrane can be replaced in accordance with techniques well known in the art, at least in part, by ion exchange with other cations or anions. Preferred replacing cations include metal ions, hydrogen ions, hydrogen precursor, e.g. ammonium ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthesized membrane with a salt of the desired replacing ion or ions. Examples of such salts of cations include the halides, e.g., chlorides, nitrates and sulfates.

Cations may be incorporated into the membrane to neutralize acid sites or to adjust the diffusion properties; preferred cations to be incorporated for these purposes include metals of Groups IA and IIA of the Periodic Table of the Elements, for example, sodium, potassium, magnesium, barium, lithium, strontium, rubidium and cesium.

Siliceous membranes containing a relatively high concentration of aluminum ($SiO_2/Al_2O_3 < 100$) can be prepared directly by synthesis. Alternatively, a high $SiO_2/Al_2O_3$ membrane can be prepared first and aluminum incorporated by post-synthesis treatment, using known methods, e.g. treatment with reactive aluminum compounds such as $AlCl_3$ at elevated temperature; by adding aluminum oxide or hydroxide and treatment under hydrothermal conditions; or by treating with small amounts of sodium aluminate.

Other metals can be incorporated during synthesis (e.g. titanium, tin, iron, gallium, transition metals) or post-synthetically via known processes such as impregnation, ion exchange, vapor deposition and the like.

The diffusive properties of the membrane such as permeation rate and selectivity, depend on the geometric properties, particularly the thickness, and the particular zeolite that constitutes the membrane. A given membrane can be further modified by subsequent treatment that changes the diffusion properties. Examples of such treatments are: deposition of coke or organic compounds, such as pyridine or other carbonaceous material, at the exterior or interior of the zeolite pores, deposition of silica or silicon compounds via treatment with $SiCl_4$ or $Si(OR)_4$ followed by calcination, treatment with phosphorus compounds, incorporation of metal salts or oxides, such as of Mg, Mo, W, Sb, or other oxides such as silicon dioxide, or ion exchange, e.g., with K, Rb, Cs, or Ag.

It is also contemplated that a metal function can be incorporated into the membrane, such as Pd, Pt, Ru, Mo, W, Ni, Fe, Ag, etc. These metal-containing membranes may have essentially no acid activity, or they may have substantial acid activity to provide for dual-functional catalysis. The catalytic activity of the membrane can be adjusted from essentially zero to high activity, depending on the particular use thereof.

The membranes can be used for separation of gaseous or liquid mixtures or catalytic applications which combine chemical conversion of the reactant with in situ separation of the products.

A variety of gaseous or liquid mixtures may be separated using the membrane. Examples of mixtures advantageously separated are oxygen and nitrogen, hydrogen and carbon monoxide, linear and branched paraffins, hydrogen and methane, p-xylene and m- and/or o-xylene.

Further examples of desirable separations to be carried out with the membranes described herein include (1) removal of waxy components from distillate and lube oil fractions and of linear and slightly branched paraffins from aromatics or aromatics-containing mixtures such as reformate; (2) removal of organics from aqueous streams in which high silica ($SiO_2/Al_2O_3 > 100$) microporous materials are particularly useful; examples include removal of ethanol from fermentation mixtures used to produce beer or wine and removal of harmful organic contaminants from ground water or waste streams; and (3) removal of paraffins from aromatics using a high silica zeolite membrane, and aromatics from paraffins, using low $SiO_2/Al_2O_3$ zeolite membrane in the alkali-exchanged form.

When separation of the components of a gaseous or liquid mixture is to be accomplished, a low or zero activity zeolitic membrane is preferably used. Siliceous zeolites of low or zero activity contain no or only trace amounts of two- or three-valent metal ions; or when they contain substantial amount of such ions, their catalytic activity can be reduced to the desired low level by cation exchange with alkali or alkaline earth cations, by thermal or steam treatment, by treatment with phosphorus compounds and steaming, or by replacement of the three-valent ions, e.g., Al, by four-valent ions, e.g., Si, by treatment with hexafluorosilicate, $SiCl_4$, etc. Aluminophosphate molecular sieves also have low if any catalytic activity.

Catalytic applications can combine chemical conversion of one or more reactants with in situ separation. Such separation may involve, for example, the separation of one or all of the products from the reactant(s).

For use in a catalytic process, (i) a catalytically inactive membrane may be combined with an active catalyst, or (ii) the membrane itself may be catalytically active. As an example of the first case (i), a Pt on $Al_2O_3$ catalyst is contained in a tubular reactor whose walls consist at least partly of a catalytically inactive zeolitic membrane chosen to selectively permeate hydrogen.

Dehydrogenation of alkanes is an example of a catalytic process which may be accomplished by passing an alkane feed through the tubular reactor; the effluent contains alkene in greater than equilibrium concentration. In this way, for example, propane may be converted to propylene. In the second case (ii), the zeolitic membrane possesses catalytic activity, either acid activity, or metal activity, or both. The acid activity of siliceous zeolites can be adjusted by the amount of three-valent substituents, especially aluminum, by the degree of cation exchange from salt form to hydrogen form or by thermal or steam treatment. The acid activity of AlPO4-type zeolites can be increased by incorporation of activating agents such as silica. An example utilizing the acid activity of the membrane is the dealkylation of ethylbenzene to benzene and ethylene. Utilizing the higher permeation rate of ethylene alone or of ethylene and benzene, a higher degree of dealkylation in greater selectivity is obtained.

Activity may be correlated with acid character. Silicious zeolites may be considered to contain $SiO_4$-tetrahedra. Substitution by a trivalent element such as aluminum introduces a negative charge which must be balanced. If this is done by a proton, the material is acidic. The charge may also be balanced by cation exchange with alkali or alkaline earth metal cations.

One measure of catalytic activity may be termed the Alpha Value. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, vol. 61, p. 395.

The crystalline membranes of the present invention are readily convertible to catalytically active material for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 hr$^{-1}$ to about 20 hr$^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including olefins and/or aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes in the presence of an alkylating agent, e.g. olefins, formaldehyde, alkyl halides and alcohols, with reaction conditions including a temperature of from about 250° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over a catalyst comprising the membrane in active form include a temperature of from about 100° C. to about 760° C., a pressure of from about 0.1 atmosphere (bar) to about 200 atmospheres (bar), a weight hourly space velocity of from about 0.08 hr$^{-1}$ to about 2000 hr$^{-1}$ and a hydrogen/organic, e.g. hydrocarbon compound mole ratio of from 0 (no added hydrogen) to about 100.

In order to more fully illustrate the nature of the invention and the manner of practicing same, the following examples are presented.

EXAMPLE A

To prepare the initial batch composition, the procedure outlined by Hayhurst and Lee (*Proceedings of the 7th International Zeolite Conference*, Murakami, Y., Iijima, A, Ward, I. W., Ed., p. 113, Elsevier, Tokyo, 1986) was followed. The following is a list of the reagents used: Ludox AS-40 (DuPont) aqueous colloidal silica solution as the silica source, 50% by weight sodium hydroxide solution (Baker, reagent grade), tetrapropylammonium bromide (Aldrich), distilled water.

The tetrapropylammonium bromide, 3.475 gm, was dissolved in 50.0 gm distilled water by stirring in a polyethylene container. A 0.90 gm quantity of sodium hydroxide solution was added. The resulting solution was subsequently diluted with 54.6 gm distilled water. A 37.55 gm quantity of the silica source was slowly added with continuous stirring. About 40 ml of the suspension was poured into a 45 ml polytetrafluoroethylene (TN) (Teflon ®) lined autoclave (Parr Model 4744). The molar composition was:

2.2 $Na_2O$:100 $SiO_2$:2832 $H_2O$:5.22 TPA Br

A polytetrafluoroethylene (TN) slab (80 mm×25 mm×2.5 mm) was immersed in the solution and placed vertically along the axis of the cylindrical vessel. The autoclave was sealed and placed in a convection oven, which was preheated at 180° C.

In a second autoclave, a vycor frit, approximately 1.5 cm in diameter, already mounted inside a pyrex tube (Corning Glass) was immersed in the synthesis solution.

The autoclaves were removed from the oven after 9 days and quenched with water. The TN slab was recovered, washed with distilled water and dried at room temperature. The slab and the vycor frit with surrounding pyrex tube were observed to be covered with a uniform layer of crystallized material.

The layer of crystalline material was removed from the TN surfaces by carefully scraping with a spatula. No solid particles were found suspended in the remaining solution or settled on the bottom of the container.

The resulting membranous material was calcined in nitrogen at 560° C. and in air at 600° C. to decompose and burn the organic template. No cracks generated by the calcination process were observed.

Segments of the zeolite membrane greater than 1 cm$^2$ were selected for characterization by electron microscopy, X-ray diffraction, Silicon-NMR and hexane sorption. The membrane was crushed to powder form for X-ray and Silicon-NMR tests. It was introduced uncrushed into the sorption apparatus for hexane sorption measurements.

X-ray Diffraction, Si-NMR and Hexane Sorption

Figure 1:
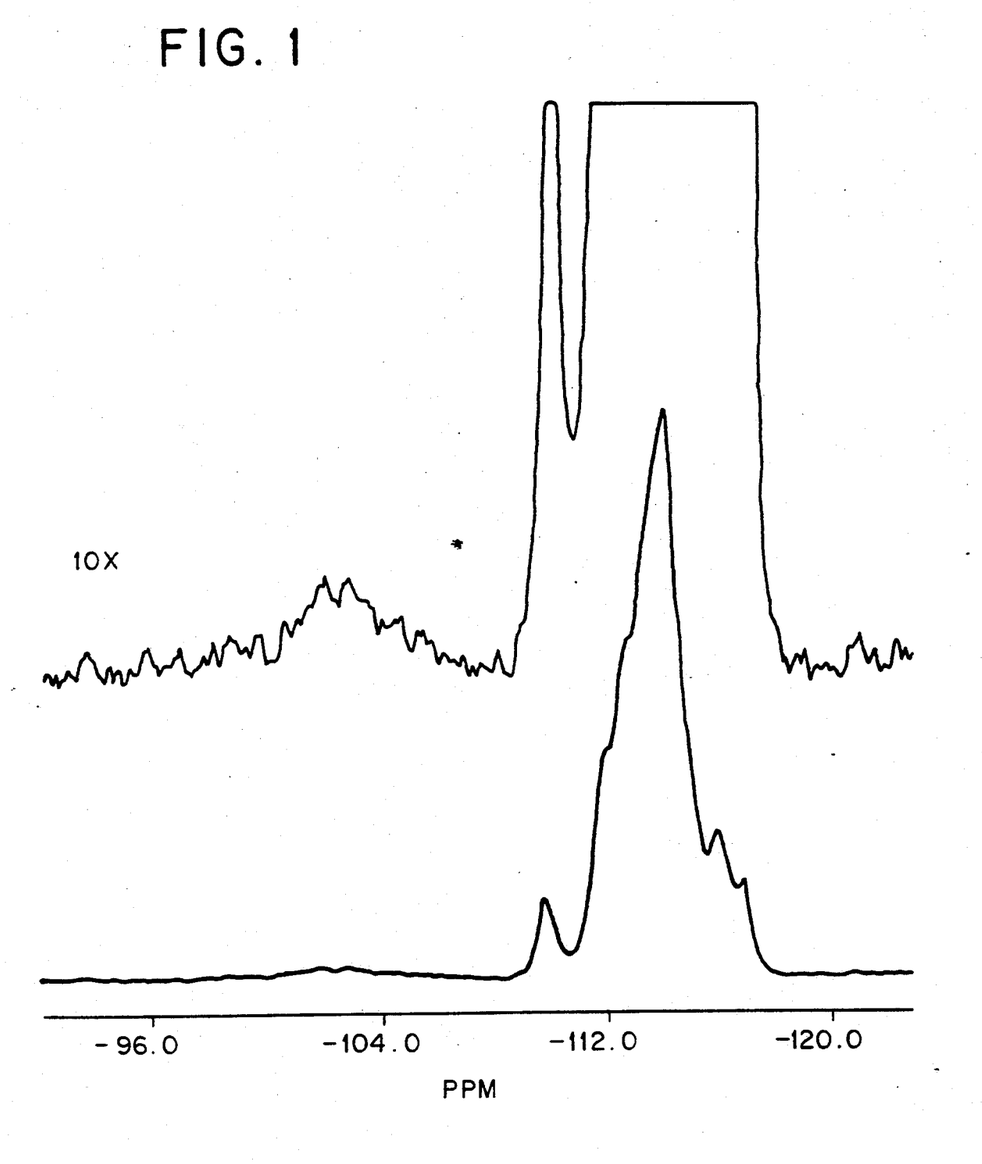
FIG. 1 is a graph of a Si-NMR spectrum of the crystalline membrane.
Figure 2A:
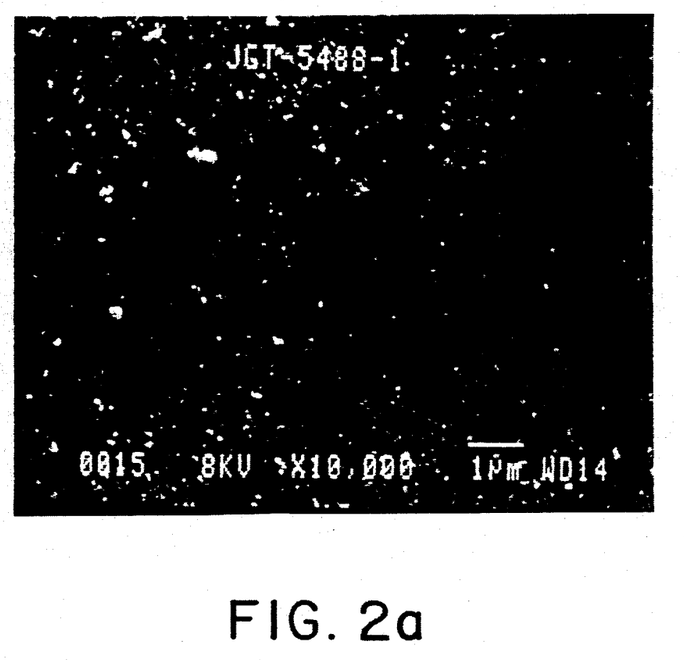
FIG. 2a shows the membrane surface which was exposed to the non-porous substrate during crystallization.
Figure 2B:
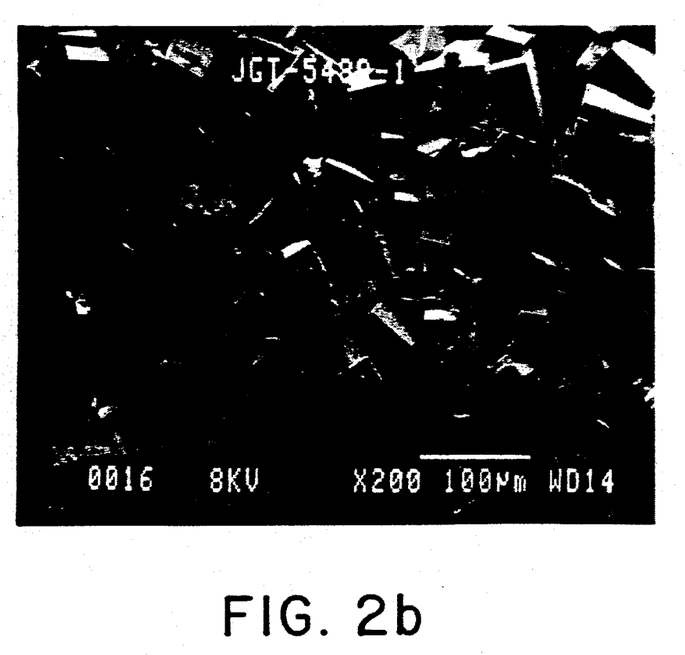
FIG. 2b shows the membrane surface which was exposed to the synthesis mixture.
Figure 2C:
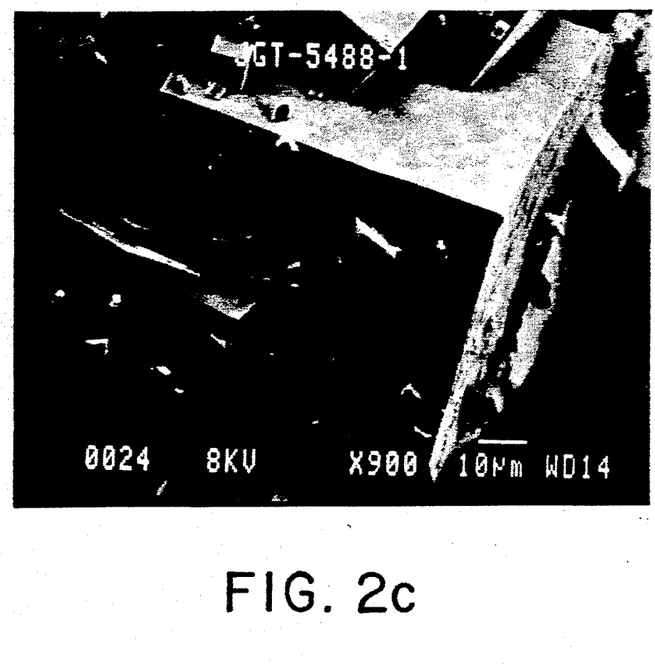
FIG. 2c shows crystal intergrowth on the surface of a large single crystal.
Figure 2D:
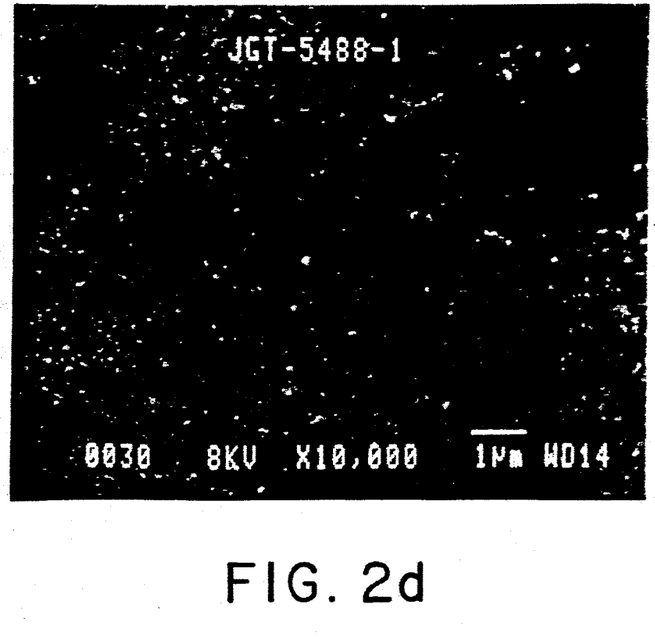
FIG. 2d is a higher magnification of the view of FIG. 2c.

The X-ray diffraction pattern was shown to be that of pure ZSM-5. The Si-NMR spectrum, FIG. 1, showed silanols as the only non-ZSM-5 framework silicons. Spectra with 30 and 300s relaxation delays were obtained to be certain no dense phases were present. Silanols, whose identity was established by crosspolarization, are seen as a broad peak at about $-103$ ppm. Their concentration is about 1.5 SiOH/unit cell or about $\frac{1}{8}$ what is normally present in a high silica/alumina ZSM-5 made from TPABr. The hexane sorption capacity, measured at 90° C. and 110.8 torr hexane partial pressure, was found to be 112.0 mg/gm of zeolite, i.e., slightly higher than the sorption capacity of standard small ZSM-5 crystals.

Electron Microscopy

FIG. 2 shows the distinct morphologies of the two membrane surfaces. FIG. 2a corresponds to the membrane surface exposed to the TEFLON® support. FIG. 2b corresponds to the surface exposed to the synthesis mixture. Although the TEFLON® side surface consists of a layer of apparently loosely held crystals of less than 0.1 μm size, the solution surface consists of a continuous array of densely packed and intergrown (twinned) crystals, 10 to 100 μm in size. The intergrowth is better shown on the surface of a large single crystal (FIG. 2c). The surface of the same crystal at even higher magnification is shown in FIG. 2d. This is partly coated with small particles, which may or may not have the ZSM-5 microstructure.

The thickness of the membrane was estimated to be about 250 μm.

EXAMPLE B

Permeability Measurements

Figure 3:
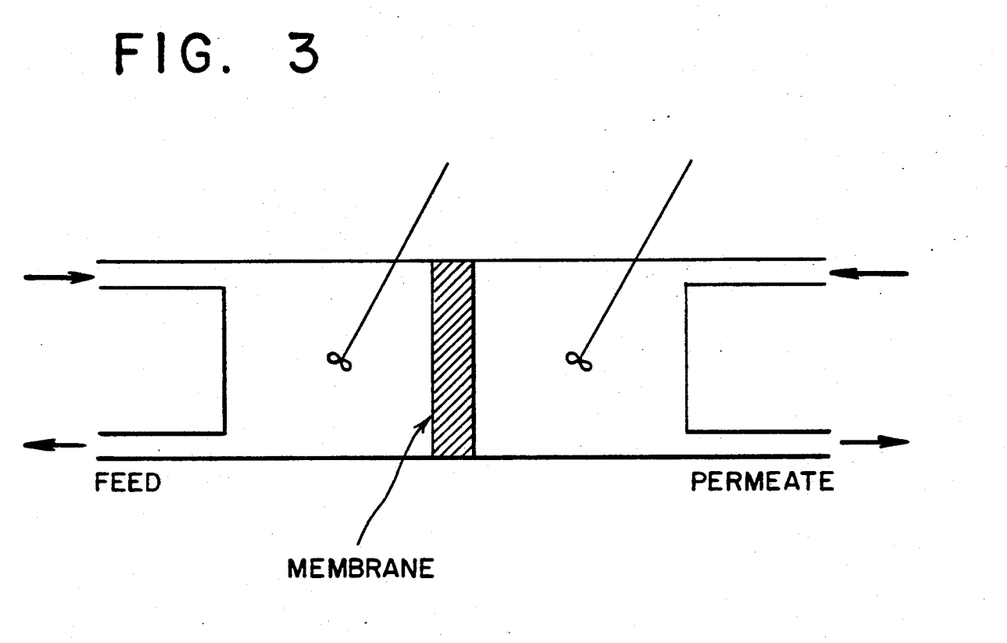
FIG. 3 illustrates the membrane affixed in a Wicke-Kallenbach cell.

Some permeability properties of the membrane of Example A were determined in a Wicke-Kallenbach cell, operated in the steady state mode (FIG. 3). Both sides of the membrane were glued with epoxy resin onto the perimeter of two Pyrex tubes, 1 cm in diameter. The membrane material extending beyond the external surface of the tubes was destroyed. A thick layer of epoxy resin was applied to the external surface of the junction to provide extra mechanical support and eliminate the possibility of gas leaks. The temperature limit of the epoxy resin used is 120° C. The Wicke-Kallenbach cell was incorporated in a standard flow apparatus, capable of operating at atmospheric or subatmospheric pressure. The permeability coefficient (P) of a component across the membrane is defined as the ratio of the flux/unit area to the external concentration gradient of the component. It is related to the Wicke-Kallenbach diffusion coefficient (Dwk) by the expression: P=Kh*Dwk (Matson et al., Chem. Eng. Sci. 38, 503 (1983)) where Kh is the Henry's Law constant. This expression is only valid in the Henry's Law regime. It reflects the fact that the true but not directly measurable driving force for diffusion, which is the intracrystalline concentration gradient, differs from the external concentration gradient due to the equilibrium partitioning of the adsorbate established between the membrane surface and the external gas phase (Koresh, et al., J. Chem. Soc., Faraday Trans. 1, 82, 2057 (1986)). For a bicomponent feed stream, the selectivity is defined as the permeability ratio. Except for a few data collected at 23° C., permeabilities were measured at 49° C. and 1 atm total pressure on both sides of the membrane. The flow rate of the feed side was 249 cc/min and that of the permeate side was 14.1 cc/min. Helium was used as a carrier gas of the permeate.

Permeability coefficients and selectivities were calculated for three bicomponent gas mixtures:

| Feed # | Composition (mole %) |
|---|---|
| 1 | 21% $O_2$/79% $N_2$ |
| 2 | 49.4% $H_2$/50.6% CO |
| 3 | 9.5% n-$C_6$/16.6% 2,2-DMB/helium balance (normal hexane/2,2-dimethylbutane) |

The following permeability coefficients and selectivities were determined:

| Feed # | Temp (°C.) | Perm. Comp. (mole %) | P1 (cm$^2$/s) | P2 (cm$^2$/s) | Selectivity |
|---|---|---|---|---|---|
| 1 | 49 | .46 ± .01/ 1.62 ± .04 | 1.31 · 10$^{-4}$ | 1.22 · 10$^{-4}$ | 1.07 ± .05 |
| 2 | 23 | 2.12 ± .05/ 1.36 ± .05 | 2.63 · 10$^{-4}$ | 1.63 · 10$^{-4}$ | 1.62 ± .04 |
| 2 | 49 | 2.20 ± .02/ 1.48 ± .01 | 2.59 · 10$^{-4}$ | 1.92 · 10$^{-4}$ | 1.54 ± .01 |
| 3 | 49 | .3 ± .002/ .0354 ± .0007 | 1.96 · 10$^{-4}$ | 1.14 · 10$^{-5}$ | 17.2 ± 1.5 |

The data indicate that the composition of the recovery stream differs form the composition of the feed stream. The membrane is shown to separate $O_2$ and $N_2$, $H_2$ and CO, and hexane and 2,2-dimethylbutane. This indicates that the zeolitic membrane can discriminate between permeates at the molecular level. The selectivities observed for the $H_2$/CO and hexane/2,2-dimethylbutane feeds strongly suggest that most of the transport across the membrane takes place in the shape selective pores of the ZSM-5 lattice.

EXAMPLES 1-4

The same synthesis mixture and conditions described in Example A were used except that the crystallization time was varied.

The thickness of the membranes formed was found to be a function of the crystallization time as shown in Table 1. It is apparent that long crystallization times lead to membranes of greater thickness.

TABLE 1

| Example | Crystallization Time, Days | Membrane Thickness, Microns |
| --- | --- | --- |
| 1 | 0.3 | 20 |
| 2 | 1 | 150 |
| 3 | 2 | 210 |
| 4 | 4 | 230 |

EXAMPLE 5

Experiment A was repeated except that a 25×25 mm flat silver plate was used instead of the teflon plate. A ZSM-5 membrane formed on the surface of the silver plate.

The silver plate was washed with water and dried at room temperature. The crystallized zeolite membrane could be readily removed from the support plate by wetting the surface with acetone at room temperature.

EXAMPLE 6

Example A was repeated using a 25×25 mm flat nickel plate. At the end of the crystallization period, the nickel plate was found to be coated with a thin ZSM-5 zeolite membrane.

EXAMPLE 7

Example A was repeated using a flat plate made of #316 stainless steel. Zeolite crystallization again occurred on the surface of the stainless steel plate in the form of a thin membrane.

Examples 1-4 illustrate that the thickness of the membrane can be adjusted by varying the crystallization time. This is not intended to mean that the thickness cannot be adjusted in other ways also. Examples 5-7 illustrate the use of various types of support plates, however, the invention is not limited to these.

The following three examples demonstrate further synthesis of membrane having the structure of ZSM-5.

EXAMPLE 8

The synthesis hydrogel of this example was prepared with the following composition:

A solution was prepared by dissolving 0.78 gm NaAlO$_2$ and 1.12 gm NaOH pellets into 497.7 gm deionized water. After all of the sodium aluminate and sodium hydroxide had dissolved, 7.98 gm tetrapropylammonium bromide salt was next dissolved in the basic solution. Finally, 60.0 gm colloidal sol (30% SiO$_2$) was added to the basic solution, and the final solution was stirred vigorously for two minutes to produce a homogeneous solution.

The resultant hydrogel is described by the mole ratios:

| | |
| --- | --- |
| H$_2$O/SiO$_2$ | 100 |
| Al$_2$O$_3$/SiO$_2$ | 0.01 |
| OH$^-$/SiO$_2$ | 0.10 |
| Na$^+$/SiO$_2$ | 0.12 |
| TPA$^+$/SiO$_2$ | 0.10 |

A quantity of the hydrogel was transferred to a one liter stainless steel autoclave which held a vertically-mounted teflon strip.

The autoclave was sealed and heating begun immediately. The autoclave was heated for 3 days at 180° C., without stirring, before quenching the autoclave to room temperature to terminate the crystallization.

After the autoclave was opened and the teflon strip was removed from the remaining liquid, it was observed that crystalline product had deposited upon the TEFLON ® surface. This crystalline zeolite membrane was physically removed intact from the teflon surface.

EXAMPLE 9

Forty-five milliliters of the hydrogel from Example 8 was transferred to a 65 ml stainless steel autoclave. A teflon strip was mounted vertically within the autoclave before the autoclave vessel was capped and sealed.

The 65 ml autoclave was then placed into a convection oven set at 180° C. The autoclave remained in the convention oven at 180° C. (at static conditions) for 4 days before removal to cool to room temperature.

When the autoclave was opened, it was observed that uniform crystalline deposit had taken place on the surface of the teflon strip. This membrane crystalline zeolite was removed intact from the teflon surface.

EXAMPLE 10

A solution was prepared as described in Example 8, except with a resultant hydrogel composition as follows:

| | |
| --- | --- |
| H$_2$O/SiO$_2$ | 29 |
| Al$_2$O$_3$/SiO$_2$ | 0.0025 |
| OH$^-$/SiO$_2$ | 0.02 |
| Na$^+$/SiO$_2$ | 0.05 |
| TPA$^+$/SiO$_2$ | 0.05 |

The hydrogel was transferred to a 45 ml teflon-lined autoclave, which held a vertically-mounted TEFLON ® slab.

The autoclave was sealed and placed in a 180° C. oven for 3 days. The autoclave was quenched, opened and the teflon slab was removed. It was observed that crystalline product in the form of a uniformly thick layer had deposited upon the teflon surface. This crystalline zeolite membrane was physically removed intact from the teflon surface.

Examples 11-18 which follow demonstrate catalytic applications of the membrane composed of molecular sieve.

EXAMPLE 11

A membrane reactor is constructed consisting of a cyclindrical tube of 2 cm diameter and 30 cm long with inner walls composed of a membrane having the structure of ZSM-5. The thickness of the ZSM-5 membrane is 12 microns and is supported by a microporous alumina support. The tube is placed concentrically inside a metal tube of 3 cm inside diameter creating an annulus with a width of about 0.5 cm. Both the inside membrane tube and the outer annulus are fitted with separate feed and exit lines.

EXAMPLE 12

A membrane reactor assembled as in Example 11 is used with a membrane wall composed of ZSM-5 of $SiO_2/Al_2O_3$ ratio >20,000, which is essentially catalytically inactive. Forty ml of HZSM-5 with a $SiO_2/Al_2O_3$ ratio of 70 in the form of 1/16 inch extrudates is placed inside the inner tube of the reactor. A feed stream of vaporized cumene with a temperature of 350° C. and 1 atmosphere pressure is passed through the tube at a weight hourly space velocity of 10 $hr^{-1}$. The reaction products propylene and benzene are withdrawn in high purity from the annular space which is swept with a stream of nitrogen.

By comparison, when the same HZSM-5 catalyst is placed in a conventional, non-membrane reactor tube, cumene is converted under the above conditions to benzene and di- and triisopropylbenzene with only traces of propylene.

EXAMPLE 13

A center tube of a membrane reactor assembled as in Example 11 composed of ZSM-5 with a $SiO_2/Al_2O_3$ ratio of 700 is filled with a mixture of 10 gm molybdenum oxide and 30 gm of quartz particles. Cyclohexane is passed through the tube at a temperature of 200° C. and pressure of 25 atm. at a WHSV of 2 $hr^{-1}$. Oxygen is passed through the annular tube at a rate of 40 ml per min. The reactor effluent contains cyclohexanone and cyclohexanol in high selectivity with only small amounts of $CO_2$.

In a conventional non-membrane rector where the oxygen is cofed with the cyclohexane feed, the selectivity to the desired product is considerably lower.

EXAMPLE 14

A center tube of a membrane reactor assembled as in Example 11 composed of ZSM-5 with a $SiO_2/Al_2O_3$ ratio of 3000 is impregnated with a solution of vanadium nitrate in an amount to give 0.5 wt % vanadium metal based on total zeolite, and treated with an air stream at 500° C. for 2 hours, to deposit a thin layer of vanadium (V) oxide on the inner surface. A mixture of isobutane and n-butane containing 40% isobutane is passed at 220° C. and 25 atm. pressure through the inner tube at WHSV of 2 $hr^{-1}$, based on the weight of the metal oxide. Air at the same temperature and 28 atm. pressure is passed through the annular space. The products collected from the inner tube product stream contain tertiary-butyl alcohol, acetone and trace quantities of $CO_2$. n-Butane is essentially unreacted and is recovered in pure form by simple distillation from the oxygenated products.

EXAMPLE 15

A reactor assembled as is Example 11 is composed of a membrane tube consisting of ZSM-5 with $SiO_2/Al_2O_3$ ratio of 220 that has been converted to the potassium form. The inner surface of the tube is impregnated with a solution of chloroplatinic acid in an amount to give 0.001 wt % platinum based on total zeolite, and treated in a hydrogen stream at 500° C. for 6 hours, to deposit platinum metal on the inner surface of the membrane tube. Isobutane preheated to 560.C is passed through the tube at 1 atmosphere and converted to isobutene and hydrogen. The latter is withdrawn in high purity from the annular reactor tube.

EXAMPLE 16

Into the membrane reactor of Example 12 is placed a mixture of 10 gm of 0.6% Pt on alumina and 20 gm alumina. A stream of isoprene containing 2% of the undesirable linear isomer, 1,3-pentadiene, is passed through the outer annular reactor at 100° C. at a flow rate of 40 gm per hour. Hydrogen in a mole ratio of 0.1 mole hydrogen per mole of hydrocarbon is passed through both the inner and outer tubes. The effluent consists of isoprene containing less than 1% of pentadiene and small amounts of n-pentane.

EXAMPLE 17

The inner tube of the membrane reactor of Example 12 is charged with 40 gm of small crystal (less than 0.1 mm) HZSM-5 with a $SiO_2/Al_2O_3$ of 70. A stream of trimethylbenzene and $H_2$ with a $H_2/HC$ mole ratio of 2 is conducted at 450° C. through the inner tube at a pressure of 20 atm. and a WHSV of 2 $hr^{-1}$. A stream of toluene and $H_2$ in a $H_2/HC$ mole ratio of 2, 450° C., 20 atm. pressure and a WHSV of 1.5 $hr^{-1}$ is conducted through the outer annular reactor space. The effluent from the outer reactor contains a mixture of toluene and xylenes containing the desired p-isomer in amounts considerably higher than the equilibrium concentration of 24%.

EXAMPLE 18

The inner tube of the membrane reactor of Example 12 is charged with 45 gm of dealuminized H-mordenite with a $SiO_2/Al_2O_3$ ratio of 15. A stream of trimethylbenzene and hydrogen with a $H_2/HC$ mole ratio of 2 is conducted through the tube at 330° C. at a WHSV of 3 $hr^{-1}$ and 30 atm. pressure. A stream of hydrogen (3 moles per mole trimethylbenzene) at a pressure of 10 atmospheres is passed through the annular reactor space. The product from the inner tube reactor contains tetramethylbenzene, small amounts of penta- and hexamethylbenzene and xylenes, together with unconverted trimethylbenzene. The product from the outer annular reactor contains p-xylene, together with small amounts of m- and o-xylene and toluene.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for the separation of components of a gaseous or liquid mixture having at least two components which comprises contacting a feedstream of the mixture with an upstream face of a non-composited, microporous membrane comprising a continuous array of crystalline molecular sieve material under separation conditions such that at least one component of the mixture has a greater steady state permeability through the membrane than at least one of the remaining components of the mixture, and recovering the component having the greater permeability on the downstream side of the membrane after contact with and passage through the membrane.

2. The process of claim 1 wherein the chemical properties of the membrane have been adjusted so that the membrane has low catalytic activity.

3. The process of claim 1 wherein the membrane has been treated by incorporating alkali or alkaline earth metal into the membrane.

4. The process of claim 3 wherein the metal is selected from the group consisting of Mg, Ca, Sr, Ba, Na, K, Li, Rb and Cs.

5. The process of claim 1 wherein the membrane has been treated by depositing into the membrane a compound selected from the group consisting of metal oxides, phosphorus compounds, silicon compounds, organic compounds, coke and alkali or alkaline earth metal cations.

6. The process of claim 1 wherein the gaseous mixture comprises oxygen and nitrogen.

7. The process of claim 1 wherein the gaseous mixture comprises hydrogen and carbon monoxide.

8. The process of claim 1 wherein the gaseous mixture comprises hydrogen and methane.

9. The process of claim 1 wherein the liquid mixture comprises a linear paraffin and a branched paraffin.

10. The process of claim 1 wherein the liquid mixture comprises p-xylene and m- and/or o-xylene.

11. The process of claim 1 wherein the membrane has been calcined.

12. The process of claim 1 wherein the membrane has been steamed at a temperature of from about 200° C. to about 800° C. for from about 1 to 50 hours.

13. The process of claim 1 wherein said molecular sieve material comprises a zeolite.

14. The process of claim 1 wherein said molecular sieve material comprises an aluminophosphate, silicoaluminophosphate, metaloaluminophosphate or metaloaluminophosphosilicate.

15. The process of claim 1 wherein said molecular sieve material consists essentially of silica.

16. The process of claim 1 wherein said molecular sieve material has composition in terms of mole ratios of oxides as follows:

$$X_2O_3:(n)YO_2$$

wherein X is a trivalent element selected from the group consisting of aluminum, boron, iron and gallium and combinations thereof; Y is a tetravalent element selected from the group consisting of silicon, germanium, titanium and combinations thereof; and n is at least about 2.

17. The process of claim 16 wherein X comprises aluminum and Y comprises silicon.

18. The process of claim 16 wherein n is from about 20 to about 10,000.

* * * * *